(12) United States Patent
Breuer et al.

(10) Patent No.: US 8,252,145 B2
(45) Date of Patent: Aug. 28, 2012

(54) METHOD AND DEVICE FOR INSTALLING SEAMED INDUSTRIAL FABRIC

(75) Inventors: Hans Peter Breuer, Zell u.A. (DE); Harald Reiterer, Grafenbach (AT)

(73) Assignee: Huyck Licensco, Inc., Raleigh, NC (US)

( * ) Notice: Subject to any disclaimer, the term of this patent is extended or adjusted under 35 U.S.C. 154(b) by 27 days.

(21) Appl. No.: 13/011,312

(22) Filed: Jan. 21, 2011

(65) Prior Publication Data
US 2011/0192561 A1      Aug. 11, 2011

Related U.S. Application Data

(60) Provisional application No. 61/302,650, filed on Feb. 9, 2010.

(51) Int. Cl.
*D21F 1/32*      (2006.01)
(52) U.S. Cl. .................. 162/200; 162/289; 162/900
(58) Field of Classification Search ............ 162/200, 162/289, 358.1, 358.2, 358.4, 900–904, 348; 139/383 AA, 383 A; 33/31 V
See application file for complete search history.

(56) References Cited

U.S. PATENT DOCUMENTS
3,972,105 A      8/1976  Miller et al.

FOREIGN PATENT DOCUMENTS
FR      1 547 122      1/1977

OTHER PUBLICATIONS

The International Search Report and The Written Opinion for PCT/US2011/023555 mailed Apr. 26, 2011.

*Primary Examiner* — Mark Halpern
(74) *Attorney, Agent, or Firm* — Myers Bigel Sibley & Sajovec

(57) ABSTRACT

A method of installing an industrial fabric on a machine configured to utilize such a fabric includes as a first step: (a) providing an industrial fabric having: a plurality of machine direction (MD) yarns, the MD yarns forming seam loops at first and second ends of the fabric; a first flap attached adjacent the first end and underlying a first portion of the fabric, the first flap including a first zipper track on an edge portion thereof; and a second flap attached adjacent the second end and underlying a second portion of the fabric, the second flap including a second zipper on an edge portion thereof, the second flap able to stretch elastically such that the distance between its attachment to the second portion of the fabric and the second zipper track can increase when a load is applied to the second zipper track. The method comprises the further steps of: (b) positioning the industrial fabric in the machine; (c) intermeshing the first zipper track and the second zipper track; (d) interdigitating the seam loops on the first end and the second end; and (e) inserting a pintle through the interdigitated seam loops. The use of the flaps can help to align the seam loops, thereby facilitating the subsequent insertion of the pintle.

20 Claims, 5 Drawing Sheets

METHOD AND DEVICE FOR INSTALLING SEAMED INDUSTRIAL FABRIC

RELATED APPLICATION

This application claims priority from U.S. Provisional Patent Application Ser. No. 61/302,650, filed Feb. 9, 2010, the disclosure of which is hereby incorporated herein in its entirety.

FIELD OF THE INVENTION

The present invention relates generally to industrial fabric applications, and more particularly to fabrics used in industrial dewatering processes, such as pulp or sludge dewatering.

BACKGROUND OF THE INVENTION

In forming paper and other sheet materials, twin-wire presses have become popular in recent years. These machines differing from a conventional fourdrinier machine in that the formation of the sheet or web takes place between a pair of wires (often formed of a woven fabric) with dewatering accordingly taking place simultaneously in a pair of opposed directions through both of the wires. In this way it is possible to accelerate the dewatering considerably. As a result of this increased efficiency in the dewatering action, a twin-wire section can be made much shorter and in many ways is more economical than a conventional fourdrinier.

Fabrics for twin wire machines may be "flat-woven" and formed after weaving into an endless belt, or can be woven in endless form. Generally, the flat-woven process is preferred, as it is typically less expensive and more versatile than the endless weaving process.

Of course, flat weaving a fabric requires that provision be made for joining it into endless belts. Such joints should be constructed in such a manner that they are sufficiently strong to withstand the extreme tension, load, temperature, and wear conditions the fabric experiences, yet do not cause the surface of the fabric above the seam to unduly mark the web. One popular method of joining the fabric is to form loops with machine direction (MD) yarns on each end of the fabric. To form the flat-woven fabric into an endless belt, the ends of the fabric are placed adjacent to each other, with each of the loops on one end positioned between two loops on the other end in interdigitating fashion. Once at the location of the twin wire machine, the fabric can be installed by placing it onto the machine, then inserting another (usually more flexible) monofilament pin or pintle into the loops.

Some flat-woven twin wire fabrics have double pin seams formed by the MD yarns. Typically, the MD yarns are looped into either long or short loops, with the long loops projecting farther from the fabric than the short loops. The long and short loops are arranged in a staggered or alternating pattern, such that each long loop has two short loops on either side and vice versa. When the seam is formed by bringing the ends of the fabric together, the long loops of one end of the fabric are aligned with the short loops of the other end of the fabric, such that two different channels are formed by the loops to receive pintles. Double pin seams can typically provide greater strength to the seam at a given thickness than a single pin seam, thereby providing a seam area that is more like the remainder of the fabric.

Installation of the fabric onto a twin wire machine can be a time-consuming operation, particularly in the positioning of the seam loops to receive the pintle. This can be particularly true if the fabric is a double pin seam fabric of the type discussed above, as the seam loops must be carefully aligned so that both pintles can be inserted. Accordingly, it may be desirable to provide a technique that simplifies and/or facilitates installation of seamed fabrics, and in particular double pin seam fabrics.

SUMMARY OF THE INVENTION

As a first aspect, embodiments of the present invention are directed to a method of installing an industrial fabric on a machine configured to utilize such a fabric. The method comprises as a first step: (a) providing an industrial fabric having: a plurality of machine direction (MD) yarns, the MD yarns forming seam loops at first and second ends of the fabric; a first flap attached adjacent the first end and underlying a first portion of the fabric, the first flap including a first zipper track on an edge portion thereof; and a second flap attached adjacent the second end and underlying a second portion of the fabric, the second flap including a second zipper on an edge portion thereof, the second flap able to stretch elastically such that the distance between its attachment to the second portion of the fabric and the second zipper track can increase when a load is applied to the second zipper track. The method comprises the further steps of: (b) positioning the industrial fabric in the machine; (c) intermeshing the first zipper track and the second zipper track; (d) interdigitating the seam loops on the first end and the second end; and (e) inserting a pintle through the interdigitated seam loops. The use of the flaps can help to align the seam loops, thereby facilitating the subsequent insertion of the pintle, and in particular the insertion of two pintles in a double pin seam.

As a second aspect, embodiments of the present invention are directed to an industrial fabric that is designed for easy seam formation. The fabric comprises: a plurality of MD yarns, the MD yarns forming seam loops at first and second ends of the fabric; a first flap attached adjacent the first end and underlying a first portion of the fabric, the first flap including a first zipper track on an edge portion thereof; and a second flap attached adjacent the second end and underlying a second portion of the fabric, the second flap including a second zipper track on an edge portion thereof. The second flap is able to stretch elastically such that the distance between its attachment to the second portion of the fabric and the second zipper track can increase when a load is applied to the second zipper track.

As a third aspect, embodiments of the present invention are directed to a method of installing an industrial fabric on a machine configured to utilize such a fabric. The method comprises as a first step: (a) providing an industrial fabric having: a plurality of MD yarns, the MD yarns forming seam loops at first and second ends of the fabric; a first flap attached adjacent the first end and underlying a first portion of the fabric, the first flap including a first means for attachment on an edge portion thereof; and a second flap attached adjacent the second end and underlying a second portion of the fabric, the second flap including a second means for attachment that is matable to the first means for attachment, the second means being located on an edge portion of the second flap, the second flap able to stretch elastically such that the distance between its attachment to the second portion of the fabric and the second zipper track can increase when a load is applied to the second zipper track. The method comprises the further steps of: (b) positioning the industrial fabric in the machine; (c) intermeshing the first means for attachment and the second means for attachment; (d) interdigitating the seam loops on the first end and the second end; and (e) inserting a pintle through the interdigitated seam loops.

As a fourth aspect, embodiments of the present invention are directed to a method of installing an industrial fabric on a machine configured to utilize such a fabric, comprising as a first step: (a) providing an industrial fabric having: a plurality of MD yarns, the MD yarns forming seam loops at first and second ends of the fabric, the seam loops being double seam loops; a first flap attached adjacent the first end and underlying a first portion of the fabric, the first flap including a first means for attachment on an edge portion thereof; and a second flap attached adjacent the second end and underlying a second portion of the fabric, the second flap including a second means for attachment that is matable to the first means for attachment, the second means being located on an edge portion of the second flap, the second flap able to stretch elastically such that the distance between its attachment to the second portion of the fabric and the second means for attachment can increase when a load is applied to the second means for attachment. The method comprises the further steps of: (b) positioning the industrial fabric in the machine; (c) intermeshing the first means for attachment and the second means for attachment; (d) interdigitating the seam loops on the first end and the second end; and (e) inserting first and second pintles through the interdigitated seam loops.

DETAILED DESCRIPTION OF EMBODIMENTS OF THE INVENTION

Figure 1:
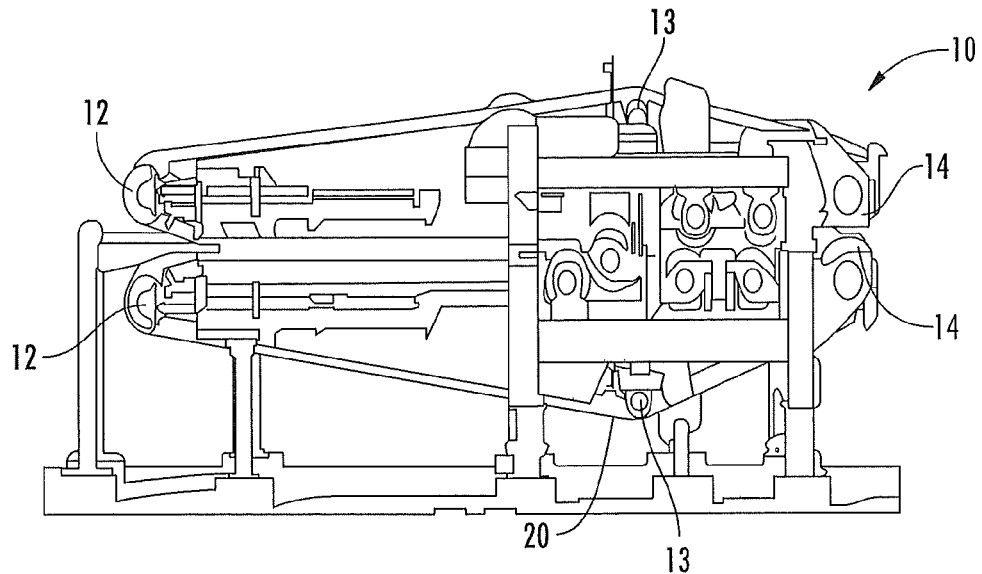
FIG. 1 is a schematic side view of a twin wire press on which an industrial fabric is mounted.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein, the terms "machine direction" (MD) and "cross machine direction" (CMD) refer, respectively, to a direction aligned with the direction of travel of the papermakers' fabric on a papermaking machine, and a direction parallel to the fabric surface and transverse to the direction of travel. Also, both the flat weaving and endless weaving methods described hereinabove are well known in this art, and the term "endless belt" as used herein refers to belts made by either method.

Referring now to FIG. 1, a twin wire press, designated broadly at 10, is illustrated therein. The press 10 includes at least one tension roll 12, a drive roll 14, and guide rolls 13 around which a fabric 20 is positioned. Herein, the fabric 20 is illustrated as a twin wire machine fabric, but may be any type of industrial fabric that includes a pin seam.

Figure 2A:
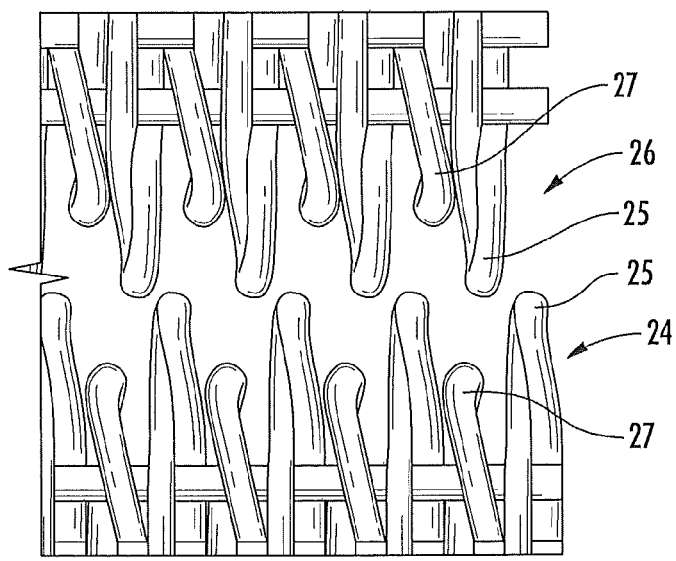
FIG. 2A is a greatly enlarged top view of the seam loops of a fabric of the present invention, wherein the ends of the fabric have not been joined.
Figure 2B:
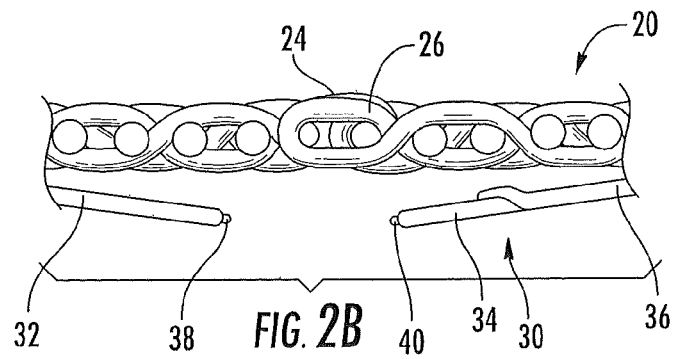
FIG. 2B is a greatly enlarged end view of the seam area of a fabric of the present invention, wherein the seam loops of the opposed ends of the fabric are interdigitated but not joined.

As seen in FIGS. 2A and 2B, the fabric 20 is flat woven and includes at each end seam loops 24, 26 formed of MD yarns 22. As can be seen in FIG. 2A, the seam loops 24, 26 comprise longer loops 25 and shorter loops 27, such that the resulting seam is a double pin seam. Interdigitating the seam loops 24, 26 and aligning them enables two pintles 42, 43 (shown in FIGS. 7 and 8) to be inserted therein to connect the ends of the fabric 20 as it is positioned on the papermaking machine 10.

FIG. 2B also illustrates that the fabric 20 also includes a seaming aligner 30. The seaming aligner 30 comprises a flap 32 that is sewn or otherwise attached adjacent one end of the fabric 20 that underlies a portion of the fabric 20 and extends the full width of the fabric 20. At its free end, the flap 32 includes a zipper track 38. The flap 32 is typically between about 0.5 and 50 inches in length. Adjacent the other end of the fabric 20, a flap 34 is attached to the fabric 20 via an intervening elastic extender 36 that is sewn or otherwise attached to the fabric 20, so that the flap 34 and the extender 36 underlie a portion of the fabric 20 and extend the full width of the fabric 20. A zipper track 40 is attached to the free end of the flap 34. The flap 34 is typically between about 0.5 and 50 inches in length, and the extender 36 is typically between about 0.5 and 50 inches in length. The zipper tracks 38, 40 are configured to mate with each other via a zipper 41 (see FIG. 3) of conventional construction.

Figure 3:
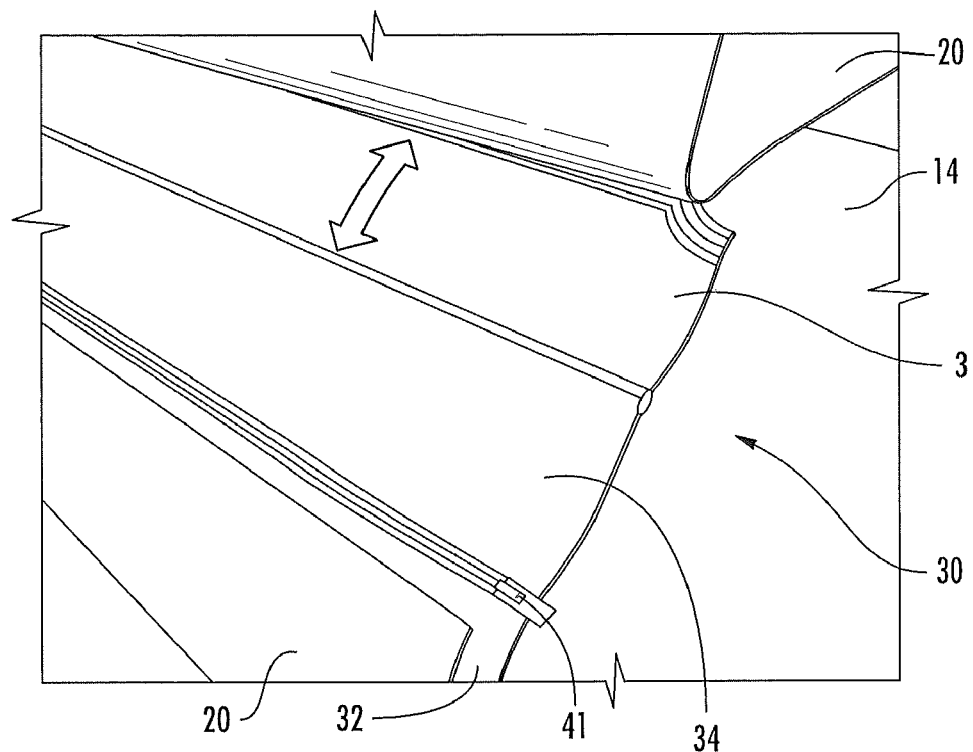
FIG. 3 is a perspective view of the seam area of the fabric of FIG. 2B, with the flaps of the seaming aligner zipped together.

The seaming aligner 30 can be employed to facilitate the installation of the fabric 20 on the twin wire machine 10. Referring now to FIG. 3, the fabric 20 is positioned within the twin wire machine 10 over and under the tension roll 12, the guide rolls 13 and the drive roll 14 along its operative path. In position, the seaming aligner 30 resides between the fabric 20 and the underlying drive roll 14. The zipper tracks 38, 40 are zipped together with the zipper 41. When the zipper tracks 38, 40 are intermeshed, the combined length of the flaps 32, 34 and the elastic expander 36 is slightly less than the combined length of the overlying end portions of the fabric 10. Typically, the position of the tension roll 12 is initially adjusted so that the fabric 20 is relatively taut when installed, with the elastic extender being slightly stretched.

Figure 4:
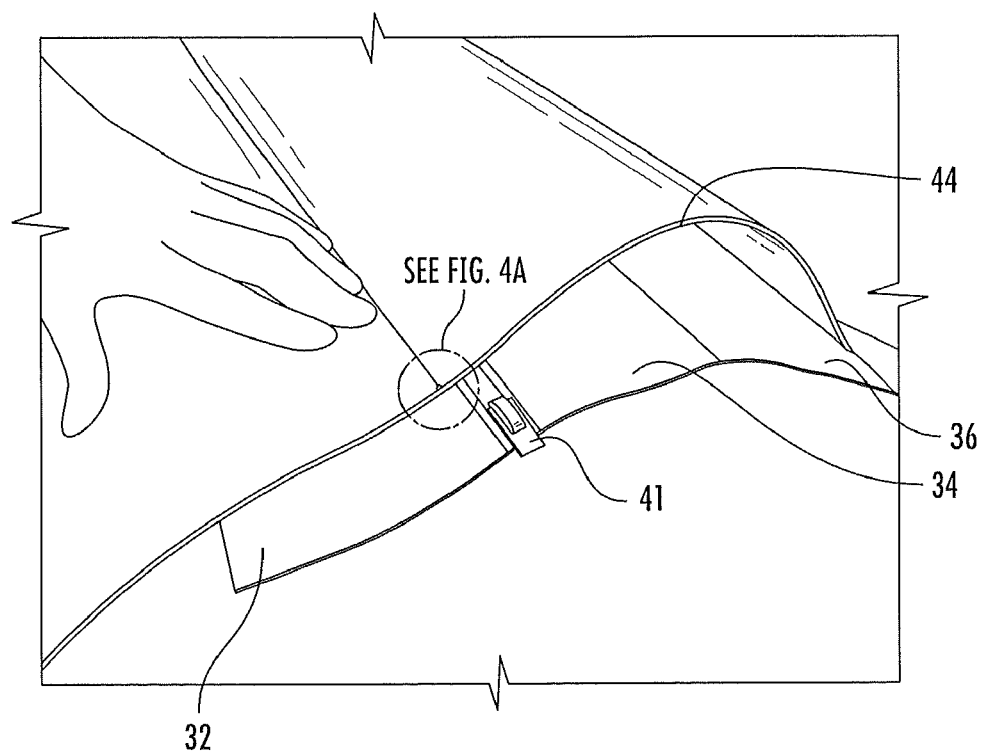
FIG. 4 is a perspective view of the seam area shown in FIG. 3, with the seam loops of the fabric being interdigitated.
Figure 4A:
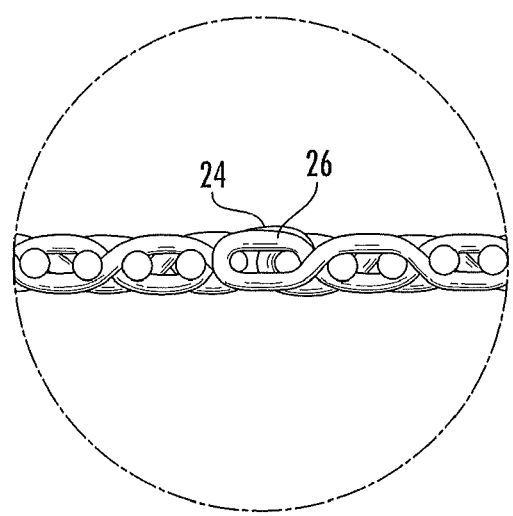
FIG. 4A is an enlarged end view of the seam area shown in FIG. 3 with the seam loops of the fabric being interdigitated.
Figure 5:
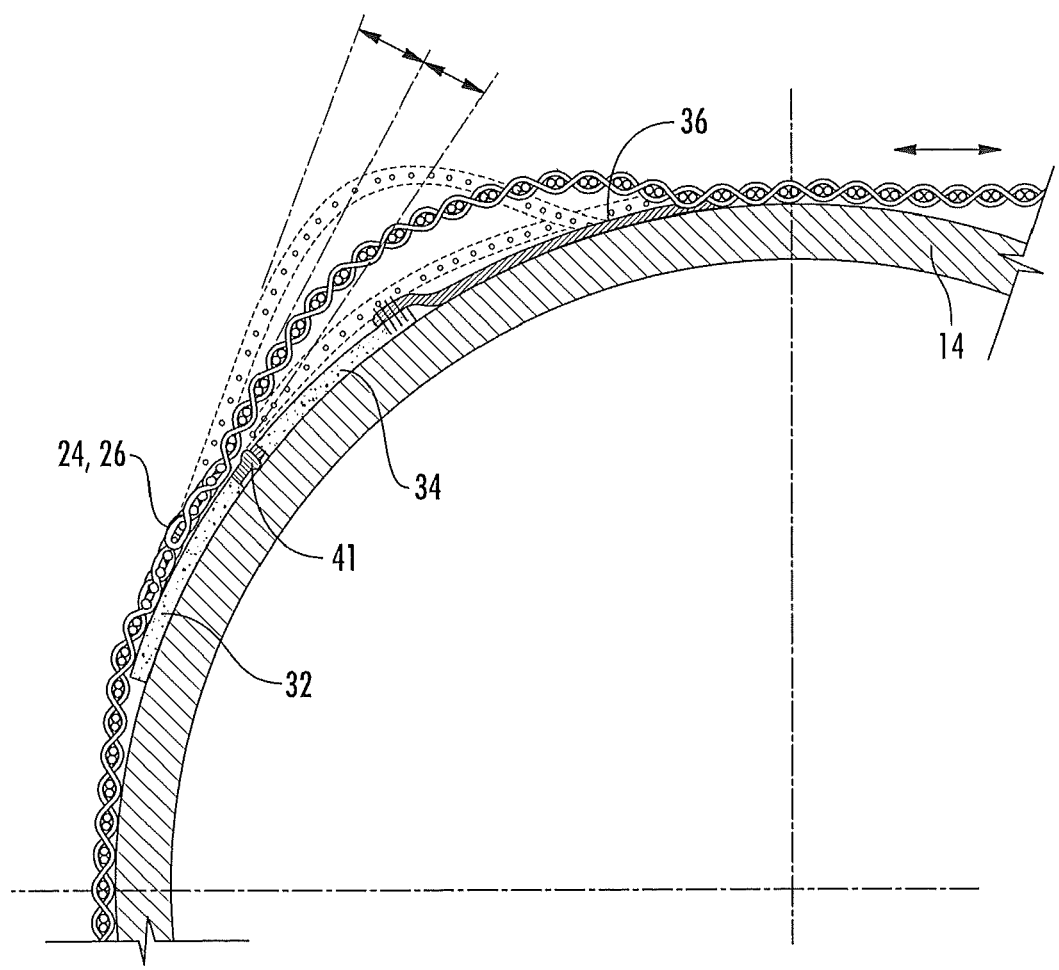
FIG. 5 is an end view of the seam area shown in FIG. 3 with the seam loops of the fabric interdigitated.

With the fabric 20 in place, an operator can then interdigitate the seam loops 24 with the seam loops 26 (see FIGS. 4 and 4A). As this step is performed, one of the end portions of the fabric 20 tends to form a CMD bump or "belly" 44 between the seam loops 26 and the attachment point of the elastic extender 36 (see FIGS. 4 and 5). This can facilitate the process of interdigitating the seam loops 24, 26.

Figure 6:
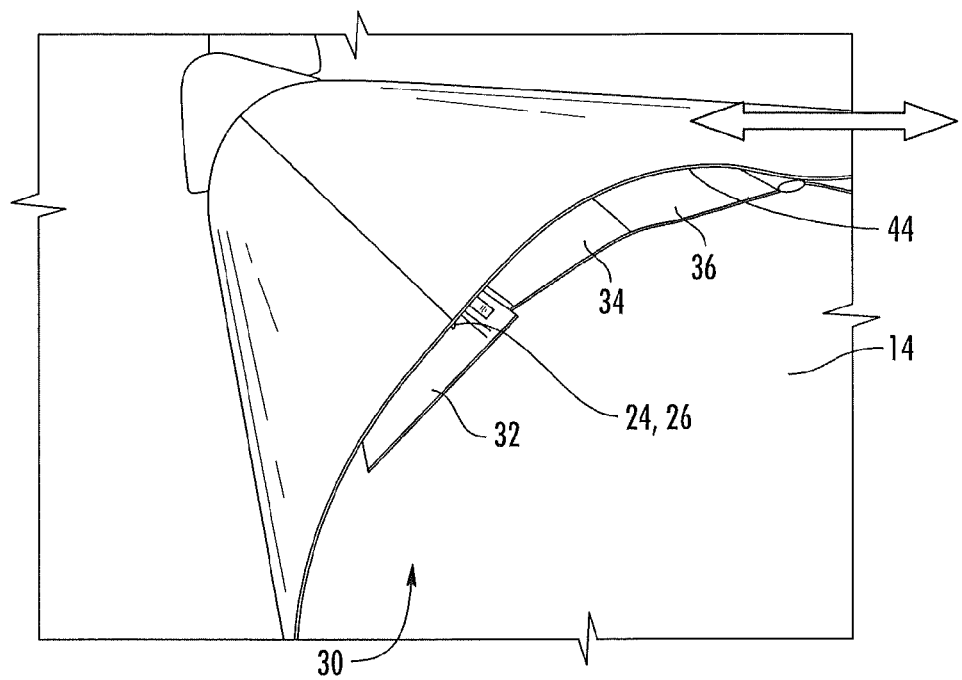
FIG. 6 is a perspective view of the seam area of FIG. 3 showing the fabric being stretched to a flattened condition against the drive roll.

Once the seam loops 24, 26 have been interdigitated, the position of the tension roll 12 can be adjusted to increase the tension in the fabric 20. Tension is increased until the "belly" 44 disappears (see FIG. 6). At this point, the fabric 20 is relatively flat on the drive roll 14, such that the seam loops 24, 26 should be properly aligned with each other. If they are slightly misaligned, the position of the tension roll 12 can be adjusted slightly until the seam loops 24, 26 are aligned. Because of the presence of the seaming aligner 30, this adjustment step can be performed easily and quickly, without disturbing the interdigitated seam loops 24, 26.

Figure 7:
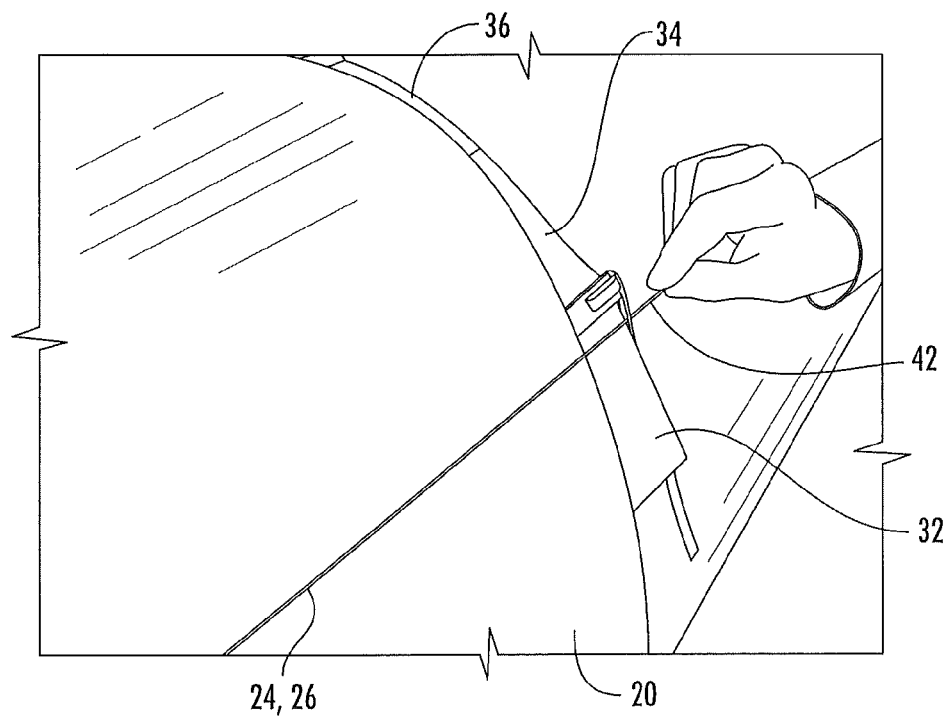
FIG. 7 is a perspective view of the seam area of FIG. 3 showing the insertion of the pintle into the aligned, interdigitated seam loops.
Figure 8:
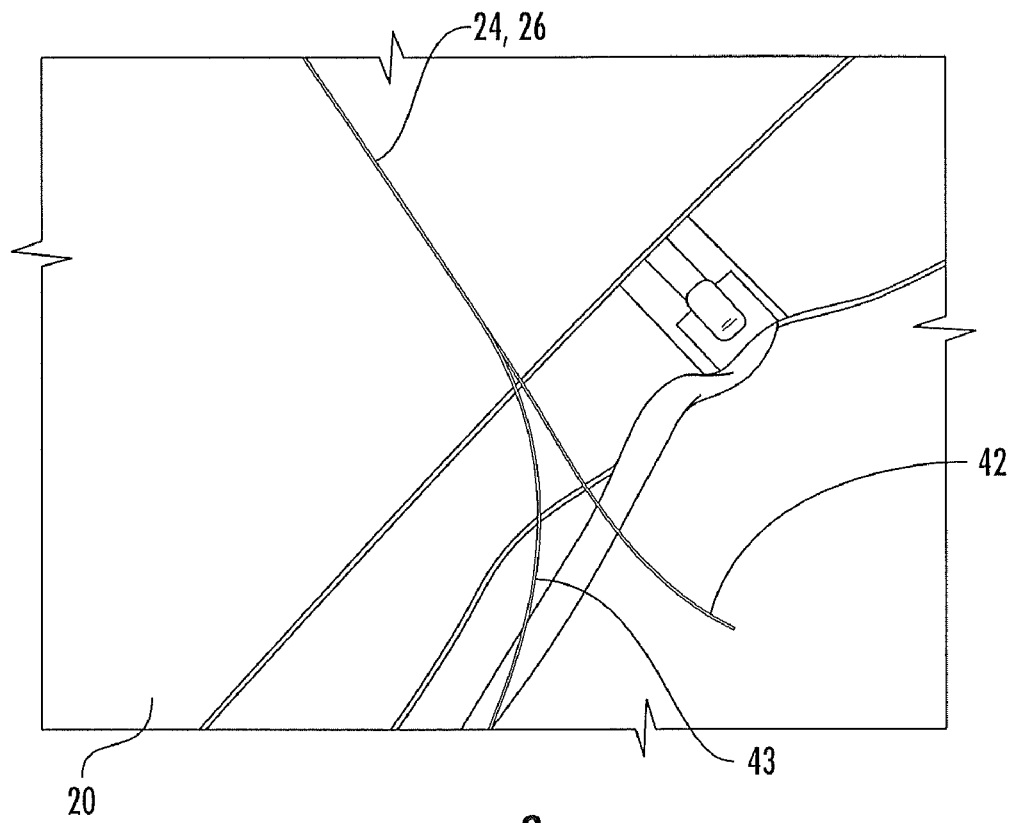
FIG. 8 is a perspective view of the seam area of FIG. 7 with the pintle inserted into the seam loops.
Figure 9:
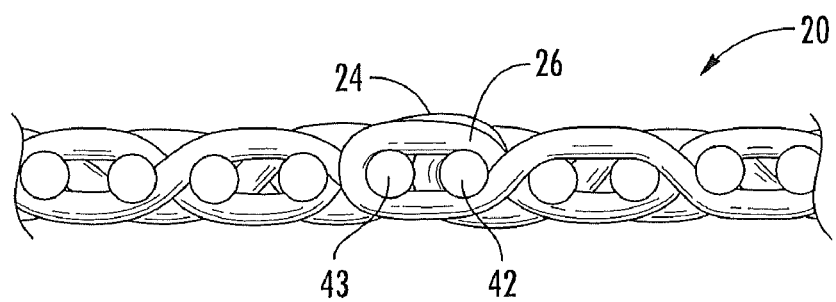
FIG. 9 is a greatly enlarged end view of the seam area of the fabric of FIG. 2 with the seaming aligner removed.

When the seam loops 24, 26 have been properly aligned, the pintles 42, 43 can be inserted into the seam loops 24, 26 to form a seam between the end portions of the fabric 20 (see FIGS. 7-9). In this embodiments, two pintles are employed; however, a seaming aligner 30 such as that described herein may be useful for a configuration in which only one pintle or more than two pintles are employed.

After the pintles 42, 43 have been inserted into the seam loops 24, 26, the seaming aligner 30 can be removed from the fabric 20 (this may require reducing the tension on the fabric 20). Once the seaming aligner 30 has been removed, tension on the fabric 20 can then be increased to operating levels.

Those of skill in this art will appreciate that other configurations of the seaming aligner 30 may also be suitable for use with this invention. For example, in some embodiments, the elastic extender 36 may be combined with the flap 34 as a single piece. One or more flaps 32, 34 may be elastic like the elastic extender 36. The flaps 32, 34 may be joined with some matable means other than a zipper; for example, snaps, VELCRO hook-and-loop fasteners, or adhesives might be used to join the flaps. Also, the flaps 32, 34 and/or the elastic extender may be attached to the fabric 20 in manner other than sewing: adhesive bonding or the like may be employed instead. Additional alternative configurations may also be suitable.

Moreover, although the seaming aligner 30 is shown in connection with a twin wire machine fabric, other industrial fabrics with seam loops, such as spiral seams or metal hook seams, may also benefit from a seaming aligner such as that described herein.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as recited in the claims. The invention is defined by the following claims, with equivalents of the claims to be included therein.

The invention claimed is:

1. An industrial fabric, comprising:
   a plurality of machine direction (MD) yarns, the MD yarns forming seam loops at first and second ends of the fabric;
   a first flap attached adjacent the first end and underlying a first portion of the fabric, the first flap including a first zipper track on an edge portion thereof; and
   a second flap attached adjacent the second end and underlying a second portion of the fabric, the second flap including a second zipper track on an edge portion thereof, the second flap configured to stretch elastically such that the distance between its attachment to the second portion of the fabric and the second zipper track increases when a load is applied to the second zipper track.

2. The industrial fabric defined in claim 1, wherein the second flap is attached adjacent the second end via an intervening elastic extender.

3. The industrial fabric defined in claim 1, wherein the seam loops are double seam loops.

4. The industrial fabric defined in claim 1, wherein the first flap is between about 0.5 and 50 inches in length.

5. The industrial fabric defined in claim 1, wherein the industrial fabric comprises a fabric for a twin wire machine.

6. The industrial fabric defined in claim 1, wherein the first zipper track is intermeshed with the second zipper track.

7. The industrial fabric defined in claim 6, wherein the seam loops of the first end are interdigitated with the seam loops of the second end and at least one of the first and second portions of the fabric forms a bump.

8. The industrial fabric defined in claim 7, further comprising a pintle inserted in interdigitated seam loops.

9. The industrial fabric defined in claim 8, wherein the seam loops comprise double seam loops, and further comprising a second pintle inserted into the interdigitated seam loops.

10. The industrial fabric defined in claim 1, wherein the first flap is sewn to the fabric.

11. A method of installing an industrial fabric on a machine configured to utilize such a fabric, comprising the steps of:
   (a) providing an industrial fabric having:
      a plurality of machine direction (MD) yarns, the MD yarns forming seam loops at first and second ends of the fabric;
      a first flap attached adjacent the first end and underlying a first portion of the fabric, the first flap including a first zipper track on an edge portion thereof; and a second flap attached adjacent the second end and underlying a second portion of the fabric, the second flap including a second zipper track on an edge portion thereof, the second flap configured to stretch elastically such that the distance between its attachment to the second portion of the fabric and the second zipper track increases when a load is applied to the second zipper track;

(b) positioning the industrial fabric in the machine;

(c) intermeshing the first zipper track and the second zipper track;

(d) interdigitating the seam loops on the first end and the second end; and (e) inserting a pintle through the interdigitated seam loops.

12. The method defined in claim 11, further comprising the step of unzipping the intermeshed first and second zipper tracks after step (e).

13. The method defined in claim 11, further comprising the step of removing the first and second flaps after step (e).

14. The method defined in claim 11, wherein the second flap is attached adjacent the second end of the fabric via an intervening elastic extender.

15. The method defined in claim 11, further comprising the step of increasing tension in the fabric after step (d).

16. The method defined in claim 11, wherein the industrial fabric comprises a fabric for a twin wire machine.

17. The method defined in claim 11, wherein at least one of the first and second portions of the fabric forms a bump after step (d).

18. The method defined in claim 11, wherein the first flap is sewn to the fabric.

19. A method of installing an industrial fabric on a machine configured to utilize such a fabric, comprising the steps of:

(a) providing an industrial fabric having:

a plurality of machine direction (MD) yarns, the MD yarns forming seam loops at first and second ends of the fabric;

a first flap attached adjacent the first end and underlying a first portion of the fabric, the first flap including a first means for attachment on an edge portion thereof; and a second flap attached adjacent the second end and underlying a second portion of the fabric, the second flap including a second means for attachment that is matable to the first means for attachment, the second means being located on an edge portion of the second flap, the second flap configured to stretch elastically such that the distance between its attachment to the second portion of the fabric and the second means for attachment increases when a load is applied to the second means for attachment;

(b) positioning the industrial fabric in the machine;

(c) intermeshing the first means for attachment and the second means for attachment;

(d) interdigitating the seam loops on the first end and the second end; and (e) inserting a pintle through the interdigitated seam loops.

20. A method of installing an industrial fabric on a machine configured to utilize such a fabric, comprising the steps of:

(a) providing an industrial fabric having:

a plurality of machine direction (MD) yarns, the MD yarns forming seam loops at first and second ends of the fabric, the seam loops being double seam loops;

a first flap attached adjacent the first end and underlying a first portion of the fabric, the first flap including a first means for attachment on an edge portion thereof; and a second flap attached adjacent the second end and underlying a second portion of the fabric, the second flap including a second means for attachment that is matable to the first means for attachment, the second means being located on an edge portion of the second flap, the second flap configured to stretch elastically such that the distance between its attachment to the second portion of the fabric and the second means for attachment increases when a load is applied to the second means for attachment;

(b) positioning the industrial fabric in the machine;

(c) intermeshing the first means for attachment and the second means for attachment;

(d) interdigitating the seam loops on the first end and the second end; and (e) inserting first and second pintles through the interdigitated seam loops.

\* \* \* \* \*